United States Patent Office 3,049,503
Patented Aug. 14, 1962

3,049,503
VINYLBENZYLOXYBENZOPHENONES
Jerry P. Milionis, South Bound Brook, and Frank J. Arthen, Franklin Township, Somerset County, N.J., assignors to American Cyanamid Company, New York, N.Y., a corporation of Maine
No Drawing. Filed Jan. 13, 1960, Ser. No. 2,131
16 Claims. (Cl. 260—22)

This invention relates to new monomers for the preparation of polymeric materials which also have the property of selectively absorbing ultraviolet light and to the copolymers thereof. More specifically, this invention relates to compounds of the formula

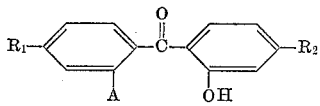

in which $R_1$ and $R_2$ may be hydrogen, lower alkyl, phenyl, alkoxy, carboxy, sulfo, sulfonamido, halogen or vinylphenylalkoxy, at least one of $R_1$ and $R_2$ being α-(vinylphenyl) alkoxy and A is hydrogen, hydroxyl, carboxy or halogen. More specifically also, this invention relates to polymeric materials comprising polymers of the polymerization products of compounds having a $CH_2=C<$ polymerizable group and including at least 0.01% compounds of the above description and also to polymerizable compositions of an unsaturated polyester, a polymerizable monomer containing a polymerizable $CH_2=C<$ group and a different monomer of the above class of benzophenones.

The field of resin additives has seen in the past few years, the development of a new type of additive, namely the ultraviolet absorber. These are compounds which selectively absorb incident ultraviolet light and readmit the energy in the form of heat or sometimes visible light. They consequently protect the resin material from photo decomposition.

A good ultraviolet absorber for use in plastics should absorb the ultraviolet in sunlight and at the same time be a colorless material by visual observation. The compound should impart no color to the plastic composition, should be sufficiently stable to undergo the conditions of curing of the plastic, and should absorb ultraviolet light sufficiently to protect the composition against yellowing and decomposition on exposure to ultraviolet light. Furthermore, the compound must have sufficient solubility in various types of materials so that it may be easily incorporated into various plastic formulations. This latter property is especially important, since an incompletely dispersed product would give poor protection.

Generally, an effective ultraviolet absorber should have its peak absorption above a wave length of 320 millimicrons. The absorption peak may be at a higher wave length, as long as absorption drops off sufficiently as it approaches the visual range so that no visible color is shown by the compound. In addition, to be effective, it should show a high degree of absorbency in the desired wave length range. However, for the most desirable ultraviolet protection, the high absorbency should be at those wave lengths sufficiently below the visual range so that the compound has no yellow color visually.

A further deficiency of commercial UV absorbers is that many show a tendency to be leached out of plastics by solvents or to be lost by evaporation during the hot molding and other heat treatments to which the plastics may be subjected. Not only does this cause a loss of protection, but also there are uses in which loss by leaching is especially undesirable. Among these is the protection of transparent plastic packages for food from discoloration. It is highly undesirable, e.g., for a plastic bag for an oleaginous food to have an ingredient which the oil in the food will dissolve out of the bag. Such containers are usually not approved for use with food. Other uses where such leaching is deleterious include plastic dishes and utensils as well as containers.

More recently there has been suggested ultraviolet absorbers which contain copolymerizable groups. The original classes of ultraviolet absorbers were usually hydroxyalkoxy derivatives of benzophenone and, more recently, benzotriazoles. The first suggestions of copolymerizable groups have been to replace the alkoxy group with an alkenyloxy or to place an alkenyl group on the ring of a benzophenone. These compounds have been found to copolymerize and to give protection to plastics in which they form, in small amounts, one of the comonomers. However, the copolymerization efficiency of such compounds has proved to be wholly inadequate. Very seldom does more than 15% of the alkenyloxy benzophenones actually become part of the polymeric chain. The remainder of the material added is easily leached out by solvent extraction. Since these compounds are expensive, such an inefficient copolymerization results in very expensive protection and it is often cheaper to use the conventional ultraviolet absorber which is a mere additive and not a comonomer.

We have found that 2-hydroxybenzophenones which carry on one or the other or both rings of the benzophenone a vinylbenzyloxy substituent is an efficient comonomer and as such provides extraordinary protection from incident ultraviolet light to polymeric materials in which it is copolymerized. The 2-hydroxybenzophenones which form our invention are described above and will be described below in more detail. We have also found that the copolymers of polymerizable ethylene compounds containing a $CH_2=C<$ polymerizable group with compounds of the above description are polymers of extraordinary stability to ultraviolet light.

The new comonomers of our invention are prepared by the reaction of further hydroxy substituted 2-hydroxybenzophenones with a chloromethylstyrene. A representative example of such a preparation is the reaction of 2,4-dihydroxybenzophenone with chloromethylstyrene as shown by the following equation:

(1)

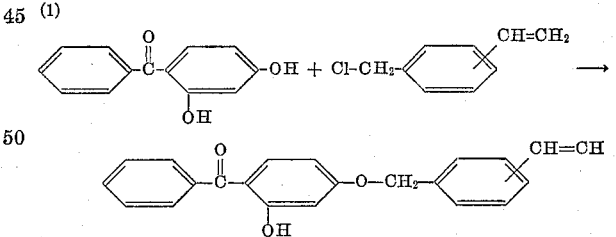

The chlormethylstyrenes which are used as one of the starting materials of the preparation of the monomers of my invention can be prepared by a number of different methods. One such is described in the copending application of Hoffenberg, Serial No. 803,674, filed April 2, 1959, now U.S. Patent 2,981,758. In this method a methylstyrene is directly chlorinated. Other methods which have been used in the past include the method described in U.S. Patent 2,780,604 wherein ethyltoluene is first chlorinated to produce 1-chloromethylphenyl ethane and the product is then dehydrochlorinated to produce chlormethylstyrene. Another method has been the direct chlormethylation of styrene. In many of these methods the exact position of the vinyl group with relation to the chloromethyl group is not known, or is not fixed, mixtures being obtained. The exact relation of the vinyl group to the chlormethyl group and consequently to the methylene of the benzyloxy group in the final monomers of our invention is of no importance and consequently in the above equation the vinyl group is not fixed in any one position, in most cases the position not being known.

Not only the chlormethylstyrenes, but also other α-chloralkylstyrenes, such as α-chlorethylstyrene and the like, can also be used. Consequently, the polymerizable group in the new comonomers of our invention is defined as an α-(vinylphenyl)alkoxy group, which can be represented by the formula

wherein $R_3$ can be hydrogen or alkyl. When it is hydrogen the group is the vinylbenzyloxy group. When it is $CH_3$—, the group becomes the α-(vinylphenyl)ethoxy group.

The polyhydroxybenzophenones which are used to form the ethers of our invention consist of any polyhydroxybenzophenones having at least 1-orthohydroxy group and having at least one hydroxyl group in one of the para positions. Thus, they can be such compounds as 2,4-dihydroxybenzophenone, 2,2',4-trihydroxybenzophenone, 2,2',4,4' - tetrahydroxybenzophenone, 2,4,4' - trihydroxybenzophenone, 2,4'-dihydroxybenzophenone and the like. In addition, the other ortho and the other para positions of the benzophenone which do not carry hydroxyl groups may carry other substituents such as hydrogen, carboxy and halogen, in an ortho position and halogen, alkyl, aryl, alkoxy or hydrogen in the paraposition. For example, such polyhydroxybenzophenones include:

2,4-dihydroxy-4-methylbenzophenone,
2,4-dihydroxy-4'-butylbenzophenone,
2,4-dihydroxy-4'-methoxybenzophenone,
2,4-dihydroxy-4'-butoxybenzophenone,
2,4-dihydroxy-4'-chlorobenzophenone,
2,4-dihydroxy-4'-bromobenzophenone,
2,2',4-trihydroxy-4'-methoxybenzophenone,
2,4-dihydroxy-4'-phenylbenzophenone,
2,4-dihydroxy-2'-carboxybenzophenone,
2,4-dihydroxy-2',4-dichlorobenzophenone,
2,4-dihydroxy-2'-chlorobenzophenone and the like.

The new compounds of our invention can be incorporated in resins and plastics like any other UV absorber to give good protection. However, an especially important feature of our invention lies in the ability to copolymerize well with the monomers for the various plastics and thus become an integral part of the resin molecule. Such copolymerization can be carried out with any monomer containing ethylenic double bonds, such as ethylene, propylene, butylene, styrene, methyl styrene, ethyl styrene, propyl styrene, etc., acrylic acid and its amide, methacrylic acid, acrylonitrile, vinyl esters such as vinyl acetate and chloride, vinyl ethers such as vinyl butyral, dienes such as butadiene, isoprene, chlorobutadiene, and such compounds.

They can also be included with unsaturated modifiers of polyester resins such as are described in U.S. 2,255,313, U.S. 2,443,735, U.S. 2,443,736, U.S. 2,443,737, U.S. 2,443,738, U.S. 2,443,739, U.S. 2,443,740 and U.S. 2,443,741, all of which are expressly incorporated herein by reference. Such resins are prepared from unsaturated polyester resins prepared from alpha, beta unsaturated polycarboxylic acids such as maleic, fumaric, aconitic, itaconic, monochloro maleic anhydride, and the like. These unsaturated acids are usually present in an amount approximating at least 20% by weight of the total weight of the polycarboxylic acids used and preferably in amounts varying between about 25% and 65% by weight based on the total weight of polycarboxylic acid present. If it is desired to make use of saturated polycarboxylic acids, that is, those which are free of non-benzenoid unsaturation, one could use acids such as oxalic, malonic, succinic, glutaric, sebacic and chlorinated polycarboxylic acids such as tetrachlorophthalic anhydride, hexachloroendomethylene tetrahydrophthalic acid, and the like, but preferably in amounts less than a larger proportion of the total amount of polycarboxylic acid present.

Whenever available, the anhydrides of these acids may be used, or mixtures of the acids or mixtures of the anhydrides thereof.

As polyhydric alcohols which may be used to prepare the unsaturated polyesters, it is preferred to make use of those alcohols having only two hydroxy groups although minor amounts of alcohols having three hydroxy groups, four hydroxy groups, or more hydroxy groups, may be used in minor amounts. As dihydroxy alcohols, one could use ethylene glycol, diethylene glycol, propylene glycol, dipropylene glycol, butanediol 1–4, butanediol 1–3, butanediol 1–2, pentanediol 1–2, pentanediol 1–3, pentanediol 1–4, pentanediol 1–5, hexanediol 1–6, and the like. Additionally, one could use glycerol, pentaerythritol, dipentaerythritol, and the like. The esterification of the alcohol is carried out until the acid number of the mixture has been reduced below 55.

The modifier for polyester resins is usually a polymerizable material having a $CH_2=C<$ group. Amongst these polymerizable compounds are styrene, side chain substituted styrenes such as the alpha methylstyrene, alpha ethylstyrene, and the like, or ring substituted styrene such as ortho, meta and para-alkyl styrenes such as o-methyl styrene, p-ethylstyrene, meta propyl-styrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxy-isobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexallyl disiloxane, and the like.

The modifier is used in a ratio of from 10 to 90 parts of polyester up to 60 parts to 40 parts of polyester, preferably 25 to 30 parts of modifier is used to 65 to 75 parts of polyester.

While the compounds of our invention can be used in comonomers with all of these various ethylenic type monomers, they are especially preferred as comonomers with styrene and various derivatives to form the various polystyrenes. Such styrenes include styrene, methylstyrene, ethylstyrene, dimethylstyrene, propylstyrene, butylstyrene, chlorostyrenes, cyanostyrenes, tertiarybutyl styrene, vinylbiphenyl, hydroxystyrenes, vinylbenzoic acid and vinyldiphenylethers.

The new monomers of our invention can also be included with advantage in styrenated oil modified alkyd resins, in place of or in addition to the styrene. Such resins, which are extensively used in coatings, are very well described in U.S. 2,713,039, U.S. 2,748,092 and U.S. 2,851,431, which are expressly incorporated herein by reference for the purpose of such disclosure. These resins are essentially the reaction products of drying oils and phthalic anhydride with polyhydric alcohols, modified by reaction with styrene. The styrenation can take place before or after esterification of the acids by the alcohols or at intermediate stages. The new monomers of our invention are reacted at the same stages, just like the styrene, as desired.

The usage of the vinylbenzyloxybenzophenones of our invention in the copolymers of our invention is usually small. A minimum of 0.01% by weight should be in the copolymer. Amounts of 0.5 to 2.0% are preferred. For special uses much larger amounts, sometimes as much as 20% can be used.

It is an advantage of the new monomers of our invention that they are copolymerized much more effectively with other ethylenic monomers and polymers than polymerizable ultraviolet absorbers heretofore known. It is an advantage of the polymers of our invention that they show much greater stability to deterioration from ultraviolet light than do polymers heretofore known and that this stability can be retained through all kinds of treatment such as hot molding and even through contact with solvents which, in the past, extracted the conventional ultraviolet absorber from the polymeric composition.

Our invention can be illustrated by the following examples in which parts are by weight unless otherwise specified.

*Example 1*

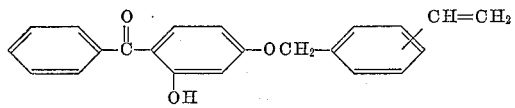

22.7 parts of 2,4-dihydroxybenzophenone, 15.3 parts of chloromethylstyrene and 18 parts of potassium carbonate in 100 parts of acetone are refluxed until the reaction is substantially complete. The mixture is cooled and diluted with 800 parts of water. The insoluble product is recrystallized from ethanol.

When 4'-t-butyl-2,4-dihydroxybenzophenone or 2',4'-dichloro-2,4-dihydroxybenzophenone are used in equivalent amounts in place of the dihydroxybenzophenones above, the corresponding t-butyl or dichloro products are obtained.

*Example 2*

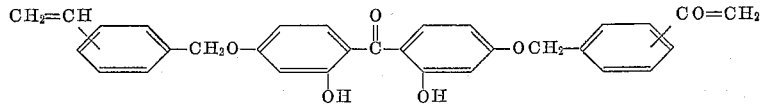

The procedure of Example 1 is followed using half the equivalent amount of 2,2,4,4'-tetrahydroxybenzophenone in place of the dihydroxybenzophenone.

*Example 3*

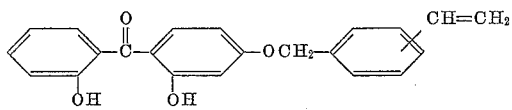

The procedure of Example 1 is followed using an equivalent quantity of 2,2',4-trihydroxybenzophenone in place of the dihydroxybenzophenone.

*Example 4*

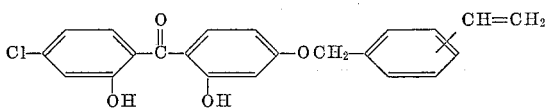

The procedure of Example 1 is followed using an equivalent quantity of 4-chloro-2,2',4-trihydroxybenzophenone in place of the dihydrobenzophenone. When 4'-bromo-2,2'4-trihydroxybenzophenone, 4'-methyl-2,2',4-trihydroxybenzophenone, 4'-butyl-2,2'4-trihydroxybenzophenone, 4'-methoxy-2,2',4-trihydroxybenzophenone and 4'-butyloxy-2,2',4-trihydroxybenzophenone are used in place of the dihydroxybenzophenone the correspondingly substituted compounds are obtained.

*Example 5*

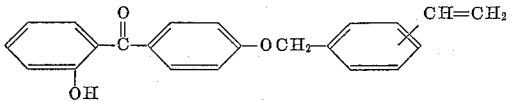

The procedure of Example 1 is followed using 2,4'-dihydroxybenzophenone in place of the 2,4-dihydroxybenzophenone. When 2,4-dihydroxy-4'-phenylbenzophenone is used in place of the 2,4-dihydroxybenzophenone, the corresponding 4'-phenyl compound is formed.

Similarly, when 2'-carboxy-2,4-dihydroxybenzophenone or 2'-chloro-2,4-dihydroxybenzophenone is used in place of the 2,4-dihydroxybenzophenone, the corresponding 2'-carboxy and 2'-chloro compounds are formed.

*Example 6*

A mixture of 9 parts of styrene and about 1 part of the compound of Example 1 is heated in the presence of 0.1 part of benzoyl peroxide as a catalyst at 80° C. for about 8 hours and 100° C. for about 72 hours in a closed container.

The resulting copolymer is added to benzene and, after complete solution, is precipitated by the addition of an excess of ethanol. After removal it is further extracted with ethanol to remove unreacted benzophenone compound from the formed copolymer.

*Example 7*

0.5 gram of the product of Example 1 and 0.05 gram of benzoyl peroxide are placed in a Pyrex tube. 4.5 grams of styrene are added. The tube is flushed with nitrogen, then sealed. The mixture is heated at 120° C. for 100 hours. The copolymer is dissolved in toluene and precipitated in an excess of alcohol. It is then given several washings with hot alcohol. A spectrophotometric analysis shows that the major part of the vinylbenzyloxybenzophenone has copolymerized.

A small amount of the copolymer is dissolved in hot toluene. This solution is brushed on a white pine panel. A very thin film is formed on the surface of the wood. A control sample is prepared by dissolving polystyrene in hot toluene and brushing this solution on a white pine panel. These two panels, along with a third panel which has no overcoating, are exposed in a Fade-Ometer for 14 hours. Both control samples become badly discolored, while the sample containing the UV absorbing copolymer shows only a slight discoloration.

When the products of Examples 3, 4, or 5 are used in place of the product of Example 1, similar copolymers are obtained.

*Example 8*

The copolymer of Example 7 is milled into polystyrene in such proportions (5.0 parts to 95 parts of the polystyrene) as to give a blend containing almost 0.5% of the benzophenone in the mixture of polymers. Molded pieces of the blend show improved resistance to exposure in the Fade-Ometer compared to polystyrene.

*Example 9*

The procedure of Example 6 is followed using 9.95 parts of styrene and 0.5 part of the compound of Example 1. The resulting copolymer shows enhanced resistance to ultraviolet light, compared to pure polystyrene.

*Example 10*

A solution of 2.4 parts of dihexyl sodium sulfosuccinate and 0.13 part of sodium bicarbonate in 165 parts of deionized water is heated to 90° C. while maintaining a nitrogen atmosphere. There is then added gradually 36 parts of acrylonitrile, 74 parts of styrene and 10 parts of the monomer from Example 1. At the same time there is added 2.4 parts of $(NH_4)_2S_2O_8$ in 15 parts of water in several portions. After the reaction is complete, excess acrylonitrile and styrene are removed by steam distillation, the polymer is coagulated, washed, and dried. This polymer is used in conjunction with alkyd resins to form surface coatings.

2.5 parts of the above tripolymer is milled into 97.5 parts of styrene-acrylonitrile (84:36) copolymer and molded into 50 mil chips. These along with unmodified styrene-acrylonitrile (84:36) chips, are exposed in the Weatherometer. The control becomes discolored while the material containing the ultraviolet absorbing comonomer shows little change.

When the compounds described in Examples 3, 4 and 5 are employed in place of 2-hydroxy-4-vinylbenzyloxy-benzophenone, similar results are obtained.

*Example 11*

Dehydrated castor oil acids (288 parts) are heated to about 245° F. A mixture of 400 parts of styrene, 4.8 parts of the product of Example 1, and 12.5 parts of benzoyl peroxide is added slowly, with agitation. The temperature is raised, during this addition to about 290° F. and is held there until the reaction is substantially complete. Unreacted styrene is removed by vacuum distillation. The styrenated alkyd is then made by adding the required amount of phthalic anhydride and glycerol and raising the temperature gradually to 450° F. and holding at this temperature until the reaction is substantially complete. Inert gas is passed through the batch during processing.

*Example 12*

A solution of an unsaturated alkyd (30 parts) (made from dehydrated castor oil, glycerol and phthalic anhydride), styrene (15 parts), the product of Example 1 (5 parts) and benzoyl peroxide (1 part) in 45 parts of xylene and 5 parts α-terpinol is heated at 145° C. until reaction is substantially complete. An ultraviolet absorbing film is produced by the additon of a catalyst, e.g. cobalt naphthenate, to the mixture, followed by air-drying a film of the mixture.

When the products of Examples 3, 4 and 5 are used in place of the product of Example 1, a similar product is obtained.

*Example 13*

A mixture of 95 parts of a resin mixture comprising a polyester of excess propylene glycol with equal mole quantities of phthalic and maleic anhydride, blended with 50% of its weight of styrene, 4.75 parts of additional styrene, 0.25 part of the product of Example 1, and 0.50 part of benzoyl peroxide is poured into a mold made of glass plates and cured in an oven for 30 minutes at 80° C., 30 minutes at 105° C. and 1 hour at 120° C. The product is an ultraviolet resistant resin composition.

When the products of Example 5 are used in place of the product of Example 1, a similar product is obtained.

*Example 14*

A mixture of 9.75 parts of styrene and .25 part of the compound of Example 2 is heated in the presence of 0.1 part benzoyl peroxide for 40 hours at 100° C. A polymer with marked resistance to UV light is obtained.

*Example 15*

A mixture of 75 parts of butadiene, 24.5 parts of styrene, 0.5 part of the product of Example 3, 0.5 part of dodecyl mercaptan, 180 parts of water, 0.3 part of potassium persulfate, and 5.0 parts of sodium stearate is stirred vigorously to form an emulsion. The emulsion is autoclaved and maintained at 50° C. for 16 hours. The resulting latex is treated with sodium chloride solution, followed by addition to a dilute sulfuric acid bath. The crumbs that are formed are filtered, washed and dried in a 60° C. oven.

We claim:

1. Compounds of the formula

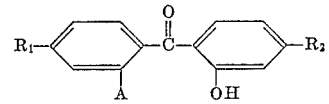

in which $R_1$ and $R_2$ are selected from the group consisting of hydrogen, lower alkyl, phenyl, lower alkoxy, carboxy, sulfo-, sulfonamide, halogen, and α-(vinylphenyl)alkoxy at least one of $R_1$ and $R_2$ being α-(vinylphenyl)alkoxy, and A is selected from the group consisting of hydrogen, hydroxyl, carboxy and halogen.

2. Compounds of the formula

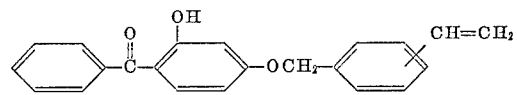

3. Compounds of the formula

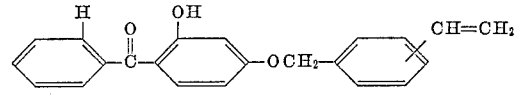

4. Compounds of the formula

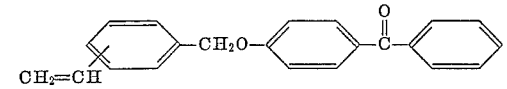

5. Compounds of the formula

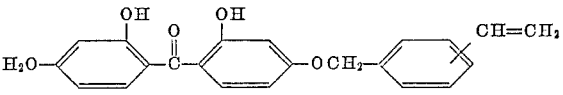

6. Compounds of the formula

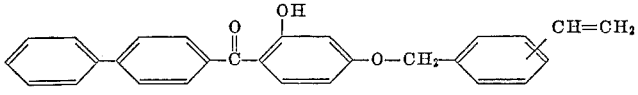

7. Compounds of the formula

8. Compounds of the formula

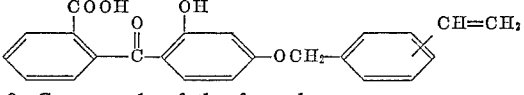

9. Compounds of the formula

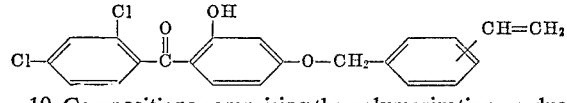

10. Compositions comprising the polymerization product of monomers having a polymerizably reactive $CH_2=C<$ group, including at least 0.01% by weight of a compound of the formula

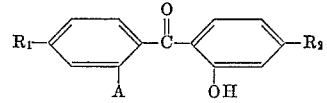

in which $R_1$ and $R_2$ are selected from the group consisting of hydrogen, lower alkyl, phenyl, lower alkoxy, carboxy, sulfo, sulfonamido, halogen, and α-(vinylphenylalkoxy), at least one of $R_1$ and $R_2$ being α-(vinylphenyl)alkoxy and A is selected from the group consisting of hydrogen, hydroxyl, carboxy and halogen.

11. Compositions of claim 10 in which the said polymerization product is an unsaturated polyester resin composition.

12. Compositions of claim 10 in which the said polymerization product is a polystyrene.

13. Compositions of claim 10 in which the said polymerization product is a copolymer comprising principally butadiene and styrene.

14. Compositions of claim 10 in which the said polymerization product is a styrenated oil modified alkyd resin.

15. A polymerizable composition comprising an unsaturated polyester resin, a different polymerizable monomer containing a polymerizably reactive $CH_2C<$ grouping and at least 0.01% by weight of a compound of a formula

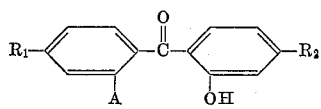

in which $R_1$ and $R_2$ are selected from the group consisting of lower alkyl, phenyl, lower alkoxy, carboxy, sulfo, sulfonamido, halogen and α-(vinylphenyl)alkoxy, at least one of $R_1$ and $R_2$ being α-(vinylphenyl)alkoxy and A is selected from the group consisting of hydrogen, hydroxyl, carboxy and halogen.

16. A polymerizable composition comprising a styrene and at least 0.01% by weight of a compound of the formula

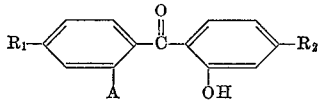

in which $R_1$ and $R_2$ are selected from the group consisting of lower alkyl, phenyl, lower alkoxy, carboxy, sulfo, sulfonamido, halogen, and α-(vinylphenyl)alkoxy, at least one of $R_1$ and $R_2$ being α-(vinylphenyl)alkoxy and A is selected from the group consisting of hydrogen, hydroxyl, carboxy and halogen.

References Cited in the file of this patent
UNITED STATES PATENTS

| | | |
|---|---|---|
| 2,861,105 | Stanley et al. | Nov. 18, 1958 |
| 2,876,210 | Wynn et al. | Mar. 3, 1959 |
| 2,906,778 | Gordon | Sept. 29, 1959 |
| 2,920,978 | Randall | Jan. 12, 1960 |
| 2,937,157 | Clark | May 17, 1960 |
| 2,962,533 | Hardy et al. | Nov. 29, 1960 |

UNITED STATES PATENT OFFICE
CERTIFICATE OF CORRECTION

Patent No. 3,049,503            August 14, 1962

Jerry P. Milionis et al.

It is hereby certified that error appears in the above numbered patent requiring correction and that the said Letters Patent should read as corrected below.

Column 2, lines 50 to 54, the formula should appear as shown below instead of as in the patent:

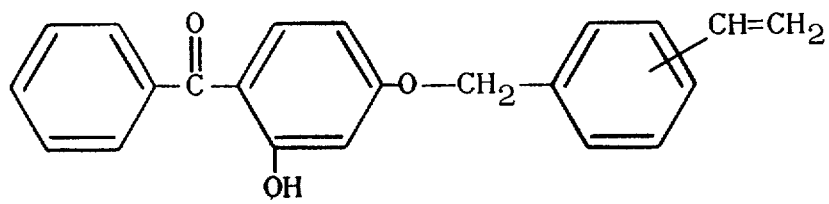

column 5, lines 36 to 40, the formula should appear as shown below instead of as in the patent:

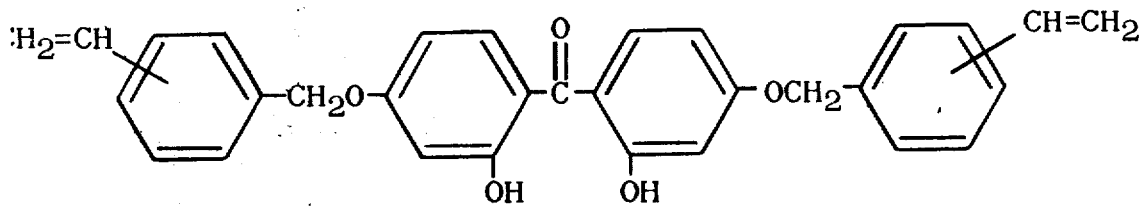

column 7, line 32, for "α-terpinol" read -- α-terpineol --;
column 8, line 15, for "sulfonamide" read -- sulfonamido --;
lines 25 to 28, the formula should appear as shown below instead of as in the patent:

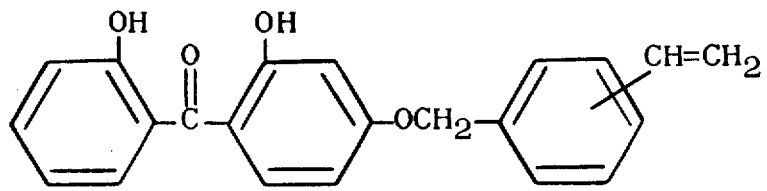

same column 8, lines 31 to 33, the formula should appear as shown below instead of as in the patent:

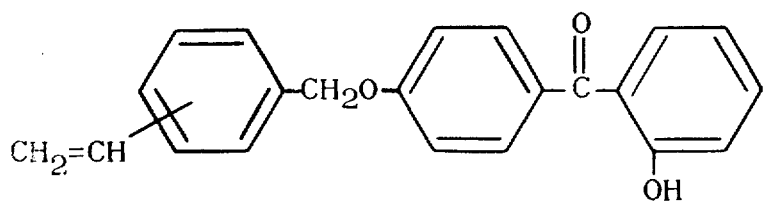

3,049,503 same column 8, lines 46 to 48, the formula should appear as shown below instead of as in the patent:

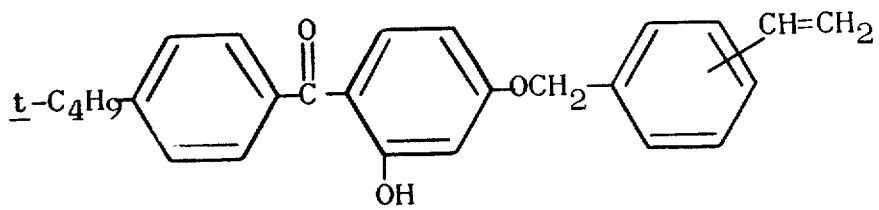

column 9, line 13, for "a", second occurrence, read -- the --.

Signed and sealed this 21st day of May 1963.

(SEAL)
Attest:

ERNEST W. SWIDER
Attesting Officer

DAVID L. LADD
Commissioner of Patents